US011347218B2

(12) United States Patent
Wang

(10) Patent No.: US 11,347,218 B2
(45) Date of Patent: May 31, 2022

(54) PORTABLE UNIVERSAL AUTONOMOUS DRIVING SYSTEM

(71) Applicant: Shawn Wang, Clarkston, MI (US)

(72) Inventor: Shawn Wang, Clarkston, MI (US)

(*) Notice: Subject to any disclaimer, the term of this patent is extended or adjusted under 35 U.S.C. 154(b) by 124 days.

(21) Appl. No.: 16/109,865

(22) Filed: Aug. 23, 2018

(65) Prior Publication Data

US 2019/0155285 A1 May 23, 2019

Related U.S. Application Data

(60) Provisional application No. 62/589,483, filed on Nov. 21, 2017.

(51) Int. Cl.
  *G05D 1/00* (2006.01)
  *G05D 1/02* (2020.01)
  (Continued)

(52) U.S. Cl.
  CPC ....... *G05D 1/0088* (2013.01); *B60R 16/0373* (2013.01); *G05D 1/0055* (2013.01);
  (Continued)

(58) Field of Classification Search
  CPC .. G05D 1/0088; G05D 1/0255; G05D 1/0055; G05D 1/0231; G05D 1/0257;
  (Continued)

(56) References Cited

U.S. PATENT DOCUMENTS 9,043,016 B2 * 5/2015 Filippov .............. G05D 1/0088
  700/245
10,452,257 B2 * 10/2019 Kim ....................... G02B 6/005
  (Continued)

OTHER PUBLICATIONS

VirtuallyChris; Building a Self Driving Car EP 1; Jun. 13, 2017 https://www.youtube.com/watch?v=PwOnsT2UW5o see assembly @4:30+. Images at 4:49 and 5:38.*

(Continued)

*Primary Examiner* — Christopher R Harmon
(74) *Attorney, Agent, or Firm* — Ingenium Patents LLC; Peter R. Kramer

(57) ABSTRACT

This invention includes an autonomous driving system for automobiles, comprising: one or more common electronic communication ports of autonomous driving (communication ports) that are built-in on the automobiles; and one or more universal autonomous driving portable controllers (portable controllers) that are to be plugged-in to the said communication ports that are built-in on the automobiles. The interfaces of the communication ports and the portable controllers are both standardized such that the portable controllers can be plugged-in universally to all of the automobiles that are equipped with the built-in communication ports. The communication ports comprise electronic communication of all relevant electronic control units (ECUs) and feedback information of the automobiles, dedicated for the said portable controllers to communicate with and to control the automobiles. In addition to the portable controllers, the communication ports comprise a buffer that is designed to execute a short duration of controls to make emergency stops, in case of loss of connection with the portable controllers due to accidents or other failure conditions. The portable controllers comprise a central control unit (CCU), and a plurality of sensors and processors, and a plurality of data storages, and a plurality of data links, and a Global Positioning System (GPS). The portable controllers have standardized interfaces that match with that of the communication ports. The invention disclosed herein enables all automobiles to be ready for autonomous driving with minimal cost, provided that the said communication ports are adapted to the automobiles. The said portable controllers integrate all the hardware and software relevant (Continued)

to autonomous driving as standalone devices which can share the components, simplify the systems, reduce parasitic material and components, and most importantly, will be safer when multiple sensors and processors that are based on different physics are grouped together to detect objects and environment conditions. A method of compound sensor clustering (CSC) is introduced herein. The CSC method makes the sensors and processors to self-organize and to address real-world driving conditions. The portable controllers can be mass-produced as standard consumer electronics at lower cost. The portable controllers can also be more easily updated with the latest technologies since that they are standalone devices, which would be otherwise hard to achieve when the hardware and software are built-in permanently as part of the automobiles. The invention disclosed herein is more efficient, since that the portable controllers can be plugged-in to the automobiles when there are needs for autonomous driving, comparing with current methods of integrating autonomous driving control hardware and software that are built-in to automobiles permanently, which may not be used for autonomous driving frequently. The system also decouples the liability from automotive manufactures in case of accidents. The portable controllers can be insured by insurance companies independently, much like insuring human drivers.

20 Claims, 2 Drawing Sheets

(51) Int. Cl.
| | |
|---|---|
| *B60R 16/037* | (2006.01) |
| *H04W 4/44* | (2018.01) |
| *H04L 67/12* | (2022.01) |
| *B60Q 1/00* | (2006.01) |
| *B60R 1/12* | (2006.01) |
| *B60Q 9/00* | (2006.01) |
| *B60Q 1/30* | (2006.01) |
| *H04W 4/38* | (2018.01) |
| *H04W 4/80* | (2018.01) |

(52) U.S. Cl.
CPC ......... *G05D 1/0231* (2013.01); *G05D 1/0255* (2013.01); *G05D 1/0257* (2013.01); *G05D 1/0278* (2013.01); *H04W 4/44* (2018.02); *B60Q 1/0017* (2013.01); *B60Q 1/30* (2013.01); *B60Q 9/00* (2013.01); *B60R 1/12* (2013.01); *B60R 2001/1215* (2013.01); *B60R 2001/1253* (2013.01); *B60R 2001/1284* (2013.01); *G05D 2201/0213* (2013.01); *H04L 67/12* (2013.01); *H04W 4/38* (2018.02); *H04W 4/80* (2018.02)

(58) Field of Classification Search
CPC ........ G05D 1/0278; G05D 2201/0213; H04W 4/44; H04W 4/38; H04W 4/80; B60R 16/0373; B60R 2001/1215; B60R 1/12; B60R 2001/1253; B60R 2001/1284; B60Q 1/0017; B60Q 1/30; B60Q 9/00; H04L 67/12
See application file for complete search history.

(56) References Cited

U.S. PATENT DOCUMENTS

| | | | | |
|---|---|---|---|---|
| 10,625,749 | B2* | 4/2020 | Reed | B62D 15/025 |
| 2015/0329111 | A1* | 11/2015 | Prokhorov | B60W 10/18 701/41 |
| 2017/0227960 | A1* | 8/2017 | Joyce | G05D 1/0061 |
| 2017/0305360 | A1* | 10/2017 | Zajac | G01C 3/08 |
| 2018/0075309 | A1* | 3/2018 | Sathyanarayana | G05D 1/0055 |
| 2018/0143633 | A1* | 5/2018 | Paryani | H04L 12/40013 |
| 2018/0154899 | A1* | 6/2018 | Tiwari | B60W 60/0011 |
| 2018/0276485 | A1* | 9/2018 | Heck | G06N 7/005 |
| 2018/0364711 | A1* | 12/2018 | Goldfain | G07C 5/085 |
| 2019/0137595 | A1* | 5/2019 | Choi | G05D 1/0088 |
| 2019/0281052 | A1* | 9/2019 | Lekkas | H04L 63/20 |
| 2020/0118172 | A1* | 4/2020 | Jaegal | G05D 1/0088 |

OTHER PUBLICATIONS

ReasonTV; Super Hacker George Hotz: I Can Make Your Car Drive Itself for Under $1000; Oct. 27, 2017 https://www.youtube.com/watch?v=aqdYbwY9vPU.*

* cited by examiner

PORTABLE UNIVERSAL AUTONOMOUS DRIVING SYSTEM

CROSS REFERENCE

This application claims the benefit of the applicants' prior provisional application, No. 62/589,483, filed on Nov. 21, 2017.

DESCRIPTION

Technical Field

The technology relates to the field of autonomous driving of automobiles.

Background

The current technology implementation of autonomous driving is integrating various electronics components and subsystems to automobiles permanently to achieve specific tasks of driver assistances. The current level of autonomous driving technology for mass production is integrating functions of driver assistance, or called advanced driver-assistance systems (ADAS), for specific driving tasks, such as lane-centering, adaptive cruising, collision avoidance . . . etc.

The current approach of autonomous driving technology development divides the technology ownership between the suppliers of components (hardware and software) and the automotive OEMs. Suppliers have in-depth knowledge of components and subsystems. However, they do not have direct knowledge of varieties of models of automobiles, and depend on collaborations with automotive OEMs for the system integration. On the other hand, automotive OEMs are lacking of in-depth knowledge of components and subsystems of autonomous driving, even though they are responsible for the system control integration and physical packaging. Suppliers and automotive OEMs heavily depend on each others.

Current autonomous driving technologies are based on technologies of certain sensors and their processors, together with centralized computer processors with internal algorithms to integrate all the sensed data from the sensors and processors, to reach driving policies to control the automobiles. Such technologies are rapidly changing, and are being superseded, perhaps every year. On the other hand, normal life cycles of automobiles are much longer, around ten to fifteen years. Therefore, autonomous driving systems that are built-in on automobiles permanently could not catch up with the rapid development of autonomous driving technologies, and will become obsolete during the product life cycles of the automobiles.

It will be inefficient to have the autonomous driving systems to be built-in on automobiles permanently, since that only a portion of the automobiles will be used for autonomous-driving purpose, and only in a portion of the automobiles' life cycle. Majority of the customers prefer driving automobiles on their own at most of the time. The autonomous driving function will serve customers with special needs and/or interests, but not all the customers will want to use autonomous driving function at all the time.

The cost of making autonomous driving systems to be part of automobiles is high, since that the components and subsystems need to be custom-made as parts, and be integrated by automotive OEMs into variety of models of automobiles individually. The costs are high for both suppliers and automotive OEMs.

There is an issue of liability. When accidents happen, there will be debate as who would own the liability: the automotive OEMs, or the persons that sit in the driver's seats.

The invention disclosed herein is to address all of the above issues and concerns.

SUMMARY OF THE INVENTION

The invention disclosed herein introduces a system that enables autonomous driving capabilities on all automobiles. The said system comprises two parts: one or more common electronic communication ports of autonomous driving (communication ports), that are to be made as part of the automobiles; and one or more universal autonomous driving portable controllers (portable controllers), that are to be plugged-in to the automobiles via the said communication ports.

In such system, the portable controllers integrate all the necessary hardware and software dedicated to the autonomous driving. Such portable controllers will have much higher degree of integration and sharing of hardware and software since that all the components are commonly located in the portable controllers. Furthermore, the components, particularly the sensors and processors, can be grouped dynamically to detect objects and environment conditions much more effectively and accurately. The method of which, called compound sensor clustering (CSC) will be described in details. The said portable controllers can also be easily updated and/or upgraded since they are standalone devices.

The cost to make automobiles to be capable of such autonomous driving disclosed herein will be low, since that most of the current automobiles already have internal electronic communications and controls network. Adding the communication ports disclosed herein would be relatively simple with low cost.

The embodiment of the autonomous driving system disclosed herein will make the autonomous driving much more efficient, since that the portable controllers can be plugged-in to any of the automobiles that are equipped with the said communication ports only when there are needs for autonomous driving, comparing with the current methods of permanently built-in hardware and software, which would not be used frequently.

The embodiment of the autonomous driving system disclosed herein will reduce the manufacturing cost, since that the portable controllers can be manufactured as integrated consumer electronics in mass production, instead of being custom made as separate components and be integrated and packaged into variety of models of automobiles.

The embodiment of the autonomous driving system disclosed herein will decouple the liability from automotive OEMs. When accidents happen, it will be an insurance issue managed by insurance companies that insured the portable controllers. Different consumer electronics manufactures could compete for better safety, more user friendliness, and low cost of their products of portable controllers. Insurance companies can evaluate the performance records of the portable controllers from competing manufactures to set their insurance rates accordingly, much like insuring individual human drivers based on their driving records.

BRIEF DESCRIPTION OF THE DRAWINGS

The accompanying drawings, which constitute as part of this specification, demonstrate embodiments of the disclosed invention.

DETAILED DESCRIPTIONS

The embodiment of the disclosed invention herein relates to autonomous driving of automobiles at various locations, comprising: one or more apparatuses that are built-in on the automobiles to serve as the common electronic communication ports of autonomous driving (communication ports) (100 in FIG. 1); and one or more apparatuses that serve as the universal autonomous driving portable controllers (portable controllers) (200 in FIG. 2), that can be plugged-in to the said communication ports (100 in FIG. 1) to accomplish the autonomous driving.

Figure 1:
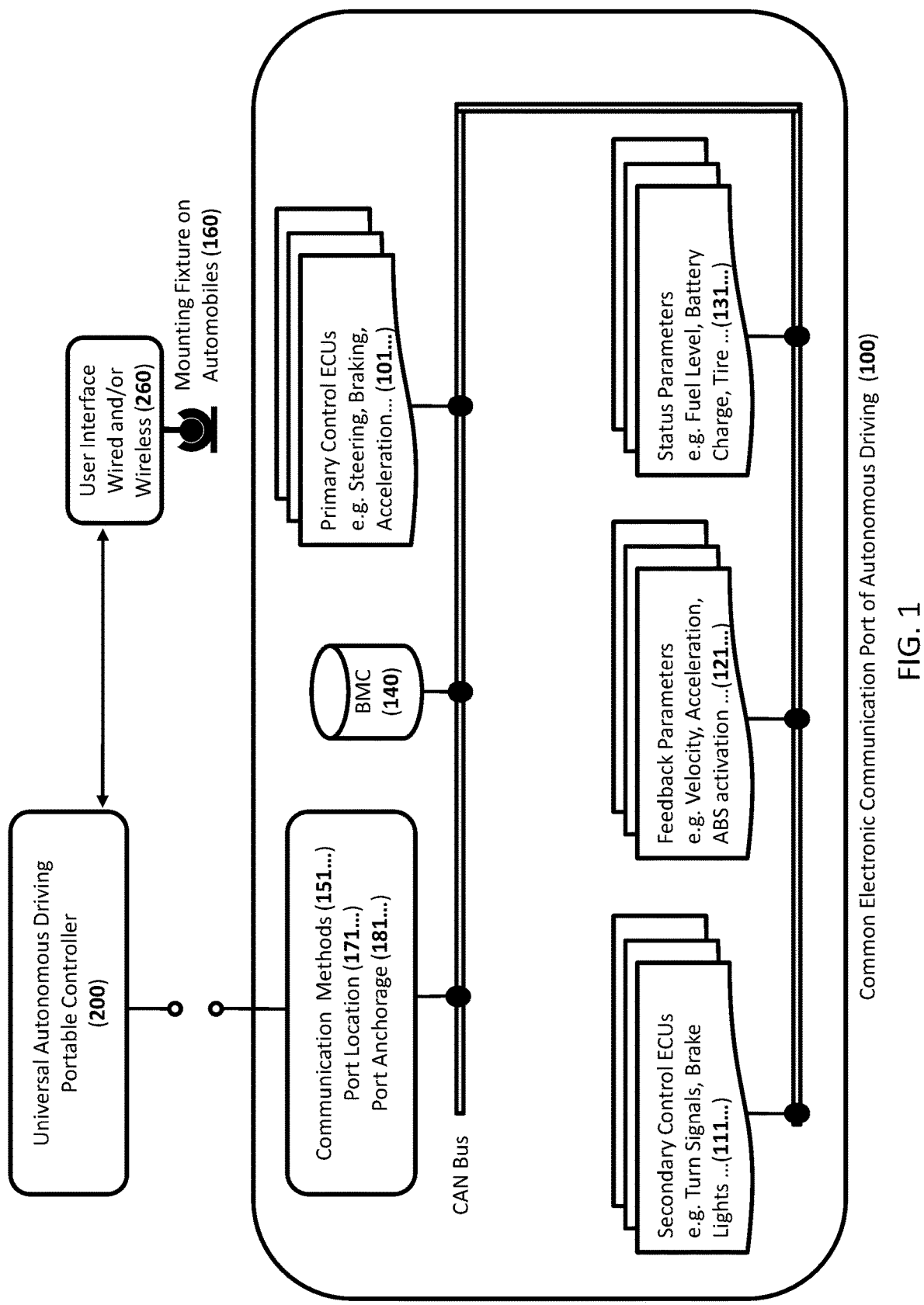
FIG. 1 shows the design of the Common Electronic Communication Port of Autonomous Driving (100), and its relation to the Universal Autonomous Driving Portable Controller (200).

FIG. 1 discloses the design of the common electronic communication port of autonomous driving (communication port) (100 in FIG. 1). The embodiment of the design disclosed herein comprises electronic communications between the automobiles on which the communication ports are built in, and the portable controllers (200 in FIG. 1), to implement the autonomous driving for the said automobiles. The said design of the communication port comprising: reliable high speed control area network systems (CAN) which are for the primary driving control parameters of electronic control units (ECUs) that include at least one of the steering, braking, and acceleration (101 . . . in FIG. 1); and control area network systems (CAN) for the secondary operational control parameters of electronic control units (ECUs) that include at least one of the turn signals, brake lights, emergency lights, head and tail lamps, fog lamps, windshield wipers, defrosters, defogs, window regulators, door locks etc. (111 . . . in FIG. 1); and control area network systems (CAN) for feedback parameters that include at least one of the velocity, acceleration, ABS activation, airbag deployment etc . . . (121 . . . in FIG. 1); and control area network systems for status parameters that include at least one of the fuel level, battery charge, tire pressure, engine oil level, coolant temperature, windshield washer level etc (131 . . . in FIG. 1); and an apparatus of buffer memory controller (BMC 140 in FIG. 1) which provides emergency control to make emergency stops for the automobiles in the event of loss of connection with the portable controller (200 in FIG. 1) due to accidents or other failure conduction; and electronic connection to the portable controller (200 in FIG. 1), which can take at least one of the methods of (151 . . . in FIG. 1) wired connection, and/or wireless connection, and/or combinations of wired and wireless connections thereof; and structural support for the portable controller (200 in FIG. 1) which can be in various of locations (171 . . . in FIG. 1) and take various of forms of anchorages (181 . . . in FIG. 1); and a mounting fixture (160 in FIG. 1) to support the user interface (260 in FIG. 1) which performs the function to take the drivers' instructions to the portable controllers (200 in FIG. 1) and to inform the drivers the feedback information from the portable controllers (200 in FIG. 1). The mounting fixture location (160 in FIG. 1) for the user interface (260 in FIG. 1) should be within the reach of the drivers in the automobiles, and within the sight of the drivers in the automobiles, and within the hearing range of the drivers in the automobiles, and within the range of the microphones on the user interface (260 in FIG. 1) to pick up the voice of the drivers.

The embodiment of the buffer memory controller apparatus (BMC 140 in FIG. 1) disclosed herein comprises a buffer memory, and a control processor, and any other associated hardware and software. The buffer memory stores control commands dedicated for emergency stops. The control commands are generated by the portable controller (200 in FIG. 1). The memory is being streamed constantly to keep up with the instantaneous road conditions. The BMC control processor executes the memorized commands only in emergency condition of loss connection with the portable controller due to accidents or other failure conditions. Such condition is to be determined by the built-in algorithms in the BMC (140 in FIG. 1). The said commands are for emergency operation in a short duration that is sufficient to stop the automobiles safely. The duration of the operation of the BMC may be measured in seconds that are needed to stop the automobiles. The actual duration will be calibrated based on the characteristics of the automobiles that the communication ports (100 in FIG. 1) are built-in, depending on their mass, dimension, dynamic characteristics, tire characteristics, and ABS characteristics etc. The BMC is to be constantly updated with the spontaneous emergency driving instructions, generated by the portable controller (200 in FIG. 1). The inclusion of the design of the BMC is a safety backup, and is not activated normally, unless lost connection with the portable controller due to accidents or in other failure conditions, and that the drivers of the automobiles could not take over driving or become incapacitated. The design of the BMC is a fail-safe feature for additional safety of the autonomous driving system disclosed herein.

The embodiment of the design of the electronic connection (151 . . . in FIG. 1) disclosed herein comprise various forms, such as, but not limited to: wired connections with multiple-pins connectors, and/or wireless connection by means of Wifi and/or Bluetooth, and/or other wireless transmission methods, and/or combinations of wired multi-pins connectors with wireless transmissions thereof. The implementation of the electronic connection methods shall be based on the prioritization of the criticality of the communication parameters, in relation to the reliability, cost, and manufacturability of the connection methods. They can be wired, wireless, or combinations of wired and wireless.

The embodiment of the design of the locations of the interface between the communication ports (100 in FIG. 1) and the portable controllers (200 in FIG. 1) disclosed herein can be at various locations (171 . . . in FIG. 1) which can be, but not limited to: at the front end of the automobiles, or on the top of the automobiles, or on both sides of the automobiles, or split into two or more locations, or the combination of the above locations thereof.

The embodiment of the design of the communication ports (100 in FIG. 1) and the portable controllers (200 in FIG. 1) disclosed herein comprise fitting that anchor the portable controllers (200 in FIG. 1) on to the communication ports (100 in FIG. 1) with structural anchorage support. The structural anchorage support can take various of forms (181 . . . in FIG. 1) such as, but not limited to: one or more fasteners, include latches or locks, for the portable controllers (200 in FIG. 1) to be anchored on to the automobiles; and/or smooth surfaces for suction cups that the portable controllers (200 in FIG. 1) can be anchored on to the automobiles; and/or electrically magnetized surfaces for powered magnetic anchorages that the portable controller (200 in FIG. 1) can be anchored on to the automobiles; and/or combinations of the above said methods thereof.

There could be variety of ways to partition the portable controllers (200 in FIG. 1). The portable controllers could be single unit or be divided to multiple units mounted on various of locations of automobiles. Correspondingly, the communication ports would adapt the same partitioning. The physical connections between the communication ports and the potable controllers include combinations of electronic connections (151 . . . in FIG. 1), the interface locations (171 . . . in FIG. 1) and the fittings (181 . . . in FIG. 1). There can be variety of ways to accomplish the connections. Following examples demonstrate some of the unique applications:

Example 1:
A single unit of a portable controller that is placed on roof top of an automobile (171 . . . in FIG. 1), with wired or wireless connection (151 . . . in FIG. 1), and be anchored by any of the fittings described (181 . . . in FIG. 1). The approximate location, the connection methods, and the fittings should be standardized such that potable controllers can be interchangeable from automobiles to automobiles.

Example 2:
A set of twin portable controllers are placed at the locations of OSRV (outside rear view mirrors), which can be anchored by latches/fasteners or electrically powered magnets. In such application, the twin portable controllers would also substitute the OSRV functions, by displaying rear view with LED screens or equivalent, instead of using optical mirrors. The rear view information should be available as part of the portable controllers features which have rear view cameras. This would make digital OSRVs. The digital OSRVs have advantages over the traditional optical OSRVs, since the angle of view can be adjusted electronically. Additionally, the view could also be zoomed or be wide-angled digitally, better than the current optical OSRVs. The digital OSRVs can have other functions that optical OSRV does not. Such function would include warning of passing vehicles in blind zones by flashing the LED displays; dimming down or lighting up the LED display according to ambient brightness/darkness etc. Such design of digital OSRV will eliminate the movable optical mirrors and motorized angle adjust mechanisms in conventional OSRVs. In such application, the communication ports would be at the location of OSRV (171 . . . in FIG. 1) with wired pin connections (151 . . . in FIG. 1). Latches or powered magnets may be used to anchor the twin portable controllers (181 . . . in FIG. 1). In such approach, the base OSRVs may also be made digital as disclosed, with own digital cameras and LED displays. The base digital OSRVs could share the same wired pin connectors, or the communication ports, as that for the twin portable controllers, make it easier to swap between the two. The connectors and the anchorages should be standardized across the automotive industries such that the twin portable controllers are interchangeable from automobiles to automobiles.

Example 3:
A set of quadruple portable controllers are inserted to the front and rear fascias. The four communication ports are to be located approximately at four outer corners of automobiles. In this application, wire harness is to be used for wired pin-connection (151 . . . in FIG. 1). Fasteners or latches can be used to anchor the four portable controllers (181 . . . in FIG. 1). The inserts should be standardized across the automotive industries in terms of geometry, dimension, and anchorage, such that the inserted four portable controllers are interchangeable from automobiles to automobiles. Furthermore, the quadruple portable controllers could be integrated with the front/rear lamps as part of assemblies (POAs). They may share the common connectors and anchorages with conventional front/rear lamps so that they can be interchangeable. However, since the styling of front/rear lamps varies from models to models of automobiles, such quadruple POAs with dual functions of portable controllers and lamps may need to be custom outfitted for their external geometries even though the core internal technologies of hardware and software for computerized control or autonomous driving are common.

The embodiment of the design of the mounting fixture (160 in FIG. 1) for the user interface (260 in FIG. 1) disclosed herein shall be standardized, so that they can be interchangeable across automotive industries. The fixture can comprise wired connection for the user interface (260 in FIG. 1), or leave it as a wireless anchorage, depend on the standardization of the user interface (260 in FIG. 1), which could be wired, or wireless, or both wired and wireless capable. The appearance style of the mounting fixture (160 in FIG. 1) can vary so that they can be made to adapt to various design styles of the interior of certain models of automobiles. The location of the mounting fixture shall be in the interior of the automobiles, and within the reach of the drivers in the automobiles, and within the sight of the drivers in the automobiles, and within the hearing range of the drivers in the automobiles, and within the range of the microphone on the user interface (260 in FIG. 1) to pick up the voice of the drivers so that the drivers can operate the portable controllers (200 in FIG. 1) via the user interface (260 in FIG. 1). Alternatively, the function of the user interface may be integrated into the center consoles or instrument panels of automobiles. In such design the user interface (260 in FIG. 1) will be part of the communication port (100 in FIG. 1) built-in to the automobiles.

The embodiment of the design of the communication port (100 in FIG. 1) disclosed herein enable the automobiles to be ready for autonomous driving, without installing hardware and software dedicated for the autonomous driving permanently. The function of autonomous driving is enabled, when the portable controllers (200 in FIG. 1) are attached to the automobiles via the communication ports (100 in FIG. 1). The disclosed design herein reduces the cost of autonomous driving by not having the hardware and software to be permanently installed on the automobiles. The disclosed design herein improves the efficiency of autonomous driving by allowing drivers to plug-in the portable controllers (200 in FIG. 1) when there are needs for autonomous driving.

The embodiment of the design of the communication ports (100 in FIG. 1) disclosed herein is to be standardized across automotive manufacturing industries, such that the portable controllers (200 in FIG. 1), would are also to be standardized for their electronic connection methods, mounting locations, and structural fittings accordingly. Therefore, the said portable controllers (200 in FIG. 1) can be readily interchanged from automobiles to automobiles that are equipped with the common communication ports. Such standardization may be implemented through SAE, and/or its international equivalents.

Figure 2:
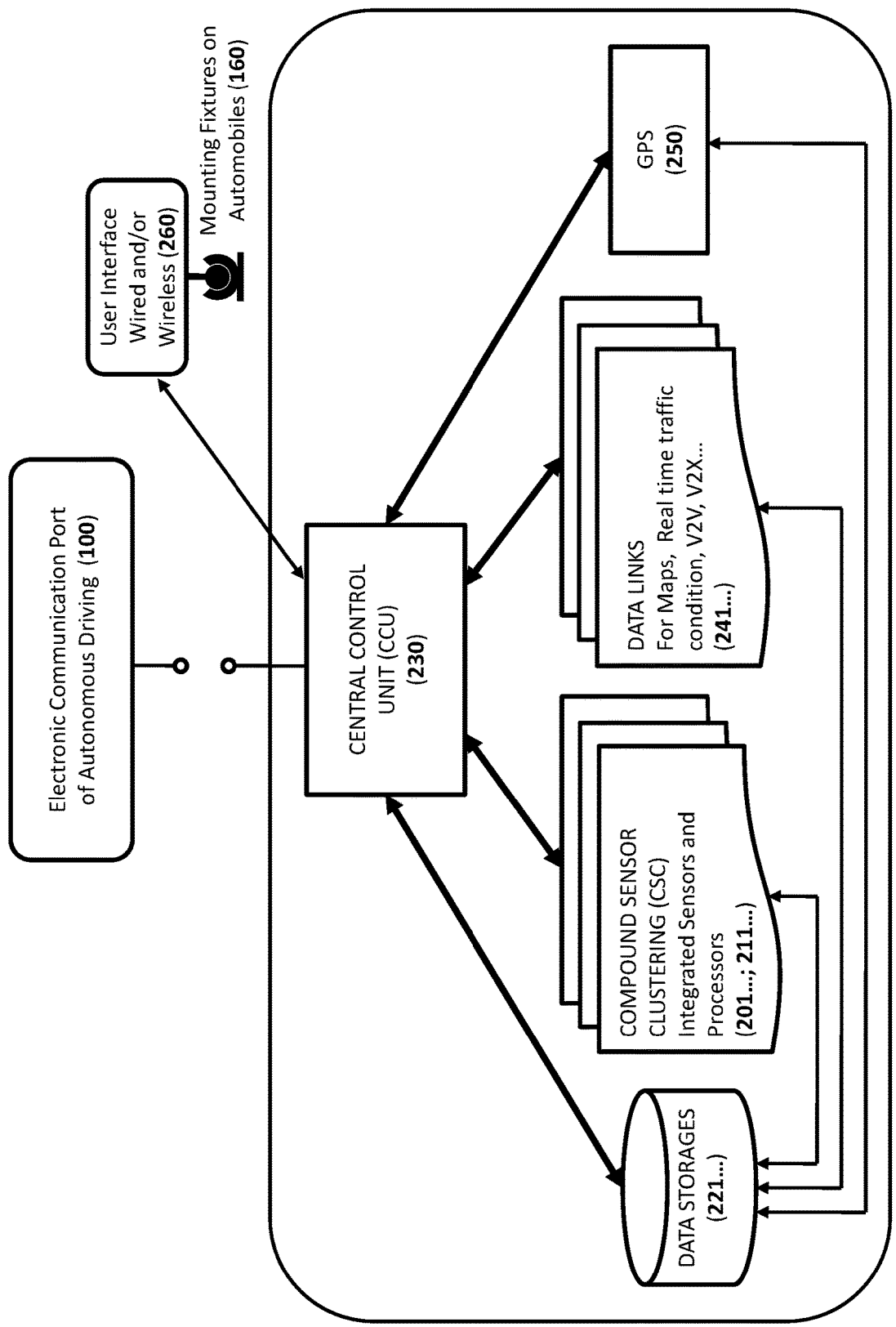
FIG. 2 shows the design of the Universal Autonomous Driving Portable Controller (200), and its relation to the Common Electronic Communication Port of Autonomous Driving (100).

FIG. 2 discloses the design of the universal autonomous driving portable controllers (portable controllers) (200 in FIG. 2). The embodiment of the design disclosed herein comprising: a plurality of sensors (201 . . . in FIG. 2); and a plurality of processors (211 . . . in FIG. 2); and a plurality of local memory storages (221 . . . in FIG. 2); and a central control unit (CCU 230 in FIG. 2); and a plurality of communication links (241 . . . in FIG. 2) to send and/or receive data; and a global positioning system (GPS) (250 in FIG. 2); and a user interface (260 in FIG. 2) for the drivers to interact with the portable controllers (200 in FIG. 2). The design of the portable controllers (200 in FIG. 2) also comprises the common connection methods, and the partitioning of the portable controllers and their mounting locations, and the structural fittings that match with that of the communication ports (100 in FIG. 1), which are to be standardized.

The embodiment of the design of the sensors (201 . . . in FIG. 2) in the portable controllers (200 in FIG. 2) disclosed herein shall comprise any sensors that can detect information for the purpose of autonomous driving. It shall not be limited to object sensors and/or image sensors that are used in the current development of autonomous driving, such as LIDARs and cameras. Such sensors comprising: one or more digital color cameras; and one or more light detection and ranging sensors (LIDARs); and one or more ultrasonic sensors; and one or more radio detection and ranging sensors (RADARs); and one or more thermal imaging cameras and/or passive infrared sensors; and one or more motion sensors (accelerometers in three dimensions); and one or more gyroscopes; and one or more physical-chemical sensors to detect the environment such as air content; and one or more sound sensors (microphones) with processors that can recognize human voice and/or warning device sound such a siren against background noises; and one or more water sensors detecting rain and intensity; and one or more temperature sensors detecting temperature at the vicinity of the automobiles; and so on . . . . The definition of sensors herein is broad, which shall include any sensors that can detect information relevant to driving conditions which could be analyzed and be integrated into the autonomous driving control policies in the portable controller (200 in FIG. 2).

The embodiment of the design of processors (211 . . . in FIG. 2) in the portable controller (200 in FIG. 2) disclosed herein comprising: one or more processors for the digital color cameras that has built-in pattern reorganization algorithms recognizing images of road signs, and/or automobiles, and/or pedestrians, and/or buildings, and/or trees, etc . . . ; and one or more processors for the light detection and ranging sensors (LIDARs), that have built-in algorithms recognizing stationary objects versus moving objects, in addition to their dimensions and distances, and could recognize categories of objects such as pedestrians, and/or automobiles, and/or buildings, and/or trees, etc . . . ; and one or more processors for the ultrasonic sensors, that have built-in algorithms differentiating stationary objects versus moving objects in near distances; and one or more processors for the radio detection and ranging sensors (RADARs) that have built-in algorithms differentiating stationary objects versus moving objects in addition to distances, velocity, rough dimensions and general category of material characteristic; and one or more processors for the thermal imaging cameras and/or passive infrared sensors, that have built-in algorithms recognizing sources of heat signatures such as pedestrians, and/or pets, and/or automobiles (ICE or battery powered), and/or fire, etc . . . ; and one or more processors for the motion sensors (accelerometers in three dimensions) that have built-in algorithms differentiating characteristics of the detected vibration and acceleration such as rough road input, and/or washboard road surfaces, and/or hitting potholes, and/or minor impacts, and/or acceleration in three dimensions, etc . . . ; and one or more processors for the gyroscopes with built-in algorithms differentiating direction and degree of the inclinations such as roll, and/or yaw, and/or dive etc . . . ; and one or more processors for each of the physical-chemical sensors with built-in algorithms differentiating air content such as, smoke, and/or air pollution (e.g. PM 2.5 level), and/or humidity, and/or oxygen content (in case of high altitude driving) etc . . . ; and one or more processors for the sound sensors (microphones) that have built in algorithms recognizing sound characteristics and interpreting their meanings, such as human languages (voice recognition) and/or police sirens; and one or more processors for the water sensors that have built-in algorithms differentiating the intensities of rain; and one or more processors for the temperature sensors that have built-in algorithms to determine the potential impact of certain temperature ranges that may affect driving controls such as snow and ice rain conditions, etc . . . . The processors disclosed herein shall include any processors that are used in conjunction with all the sensors described previously for the purposes of autonomous driving disclosed herein. The said processors comprise own built-in algorithms dedicated to interpreting information relevant to the sensors that they are associated with. Such interpretation methods could involve pattern recognition, voice recognition, and other algorithms and/or artificial intelligence methods. The said processors also have built-in algorithms to interact with each others to collectively identify the driving environment conditions, called compound sensors clustering (CSC), as will be disclosed in details.

The embodiment of the design of the processors (211 . . . in FIG. 2) in the portable controller (200 in FIG. 2) disclosed herein are integrated, taking the advantage of that the portable controller is stand alone from the automobiles, and that all the processors are commonly located in the portable controller. The sensors are to be integrated with the processors, and can be built on one or more common substrates and/or integrated circuit boards based on their functions, manufacturability, and cost etc. Such integration of sensors (201 . . . in FIG. 2) and processors (211 . . . in FIG. 2) largely simplified the design which would otherwise be complicated when the sensors and the processors are scattered in various parts of the automobiles.

The embodiment of the design of the processors (211 . . . in FIG. 2) disclosed herein comprise built-in algorithms to cross-check with each others, or to query each others. The queries are triggered when certain criteria are met for each of the sensors/processors. The queries and their triggering criteria are pre-programmed into the processors. The queries are for relevant sensors to work together to identify and confirm certain driving environment conditions. The criteria are to trigger the queries when certain sensor/processor detect information that reach the preset thresholds. One processor of a sensor may query one or more sensors/processors for relevant information. As a simple example, a processor for temperature sensor may query processor of rain sensor for a potential freezing rain road condition, if the temperature sensor senses a near freezing temperature. In this example, the criterion is the threshold of near freezing temperature, i.e. near 32 F. If the rain sensor/processor that is queried detects a rain condition simultaneously, such combined information will be forwarded to CCU which can draw a conclusion of freezing rain condition based on this particular query that involve temperature and water sensors/processors. Another simple example would be for pedestrian protection. When thermal imaging cameras or passive infrared sensors detect infrared signatures of human, its processor will query other processors of object detection sensors, such as RADARs and ultrasonic sensors, for existence of any physical objects. If the object detection is confirmed along with the infrared signatures, then it is confirmed that there are pedestrians in the detecting range. The information can be forwarded to the CCU which can control the automobile to avoid collision with pedestrians. Emergency braking or evasive maneuvering may be executed if an ultrasonic sensor/processor confirms the object with the infrared signature is at a near distance from the automobile. In this case, the querying sensors is/are thermal imaging cameras and/or infrared sensors which query the RADARs and/or ultrasonic sensors to form a cluster, in which the said sensors are working together as a group. Such cross-checking capability can be accomplished in high-speed since the processors are shared and built on common substrates and/or integrated circuit boards in the disclosed invention of the portable controller (200 in FIG. 2). In such method, the sensors/processors are grouped together dynamically when they are cross-checking for relevant information. A new method of the design, named Compound Sensor Clustering (CSC) (201 . . . ; 211 . . . in FIG. 2), is disclosed herein, for such integrated applications of sensors and processors. The design of the CSC disclosed herein comprises sensors and processors that communicate with each others to validate sensed information for certain driving conditions. The grouping of the sensors and processors in the CSC is based on specific driving conditions, and the grouping is dynamic. The definition of sensors herein can be broader. The feedback information from automobiles, such as ABS activation, traction control (TCL), airbag deployment, speed . . . etc can all be included as broad meaning of sensors. The CSCs communicate to the CCU (230 in FIG. 2) with the verified information which are categorized and standardized for various driving conditions. The CSCs produce data that are simplified for the CCU to process. In such application the CCU will receive categorized data from the CSCs, thus, minimize the computational burden in the CCU, which would otherwise need to receive, and to integrate, and to analyze data from all the sensors and the processors individually, which can be prone to error that may lead to fatal accidents. The CSCs, on the other hand, can assure the reliability of detecting any driving conditions without complicated methods such as patent recognition, by dynamically grouping the sensors for specific object detection.

The embodiment of the design of the compound sensor clustering, or the CSC (201 . . . ; 211 . . . in FIG. 2), disclosed herein makes clusters of sensors and processors function collectively as groups, and such grouping is dynamic, depending on the category of driving conditions. It is similar to human response to nature. When eras hear sound, eyes will subconsciously look into the direction where the sound comes from, before engage brain conscious thinking. In such analogy, ears and eyes are working together like a CSC. Such clustering features are to be programmed into the processors as spontaneous reaction to cross check information with other relevant sensors/processors, much like human sense and reflex.

In the real-world driving there are unlimited varieties of driving situations. However, the varieties of situations may be categorized to a few categories for the purpose of developing criteria for the sensors/processors to form CSC. Commonly encountered categories may include, but not limited to: object detection and verification; road sign and image detection and interpretation; environment condition detection and adaptation; interaction with automobiles etc . . . The application of CSC for each of the categories may be illustrated by the following examples.

The application of compound sensor clustering (CSC) for object detection and verifications can be illustrated by the following example:

Current approach of object detection uses LIDARs and/or cameras. The working mechanism of LIDAR is based on the physics of LASER beam transmission while the camera is based on optical light transmission. While both digital devices can be accurate within their defined physical means, there can be errors when the detected information is processed. For instance, a sufficiently large light-colored object could be miss-interpreted as empty space by cameras, or pedestrians may not be recognized as live human by LIDARs. There is a possibility of misidentifying objects, which can cause fatal accidents.

The above shortcomings could be overcome by other less sophisticated sensors that are based on different physics, such as RADARs, ultrasonic echoes, infrared sensors. . . etc. RADAR is based on different frequency of electro-magnetic wave transmission, and ultrasonic sensor is based on sound wave transmission, and thermal imaging camera or passive infrared sensor is sensing heat differentiation. They can be used to detect information that is out of the physical capabilities of LIDARs and cameras. When multiple sensors with different physics are used, there is little chance for all of them to miss or to miss-identify objects all together. The technologies of RADARs, ultrasonic sensors, and thermal imaging camera or infrared sensors are mature and their cost is low, comparing with LIDARs and cameras. It is relatively simple to integrate them into the portable controller (200 in FIG. 2) disclosed herein.

The thermal imaging cameras or passive infrared sensors could be particularly important for pedestrians protection, since they could identify pedestrians by their heat signatures, which is an additional safety assurance to make sure the detection of pedestrians, in case that the pattern recognition identification features associated with cameras and/or LIDARs missed or miss-identified the pedestrians.

The ultrasonic sensors could also be particularly valuable in this case, when it is clustered with the thermal imaging cameras or passive infrared sensors as CSC. For instance, when human infrared signatures are detected by thermal imaging cameras or passive infrared sensors, they may simultaneously query the ultrasonic sensors for the distance of the potential pedestrians. If the distance is short, the CSC may send the urgent information to CCU (230 in FIG. 2) which could execute an emergency braking or evasive maneuvering to prevent potential collision with pedestrians. Such action may be taken quickly, without waiting for query results from LIDARs, cameras, or RADARs, to put the pedestrians protection be the overriding priority in the autonomous driving control algorithm.

In such collective verifications between sensors and processors, the cameras and/or the LIDARs can still be the base instrument to detect precision locations and dimensions of objects along with road profiles and lane marks, which can be used by CCU for autonomous driving controls. The verification from other sensors/ processors is additional assurances for safety, particularly for object detections and verifications. The RADARs, ultrasound, thermal imaging cameras or passive infrared sensors can query cameras and/or LIDARs for objects as they have detected. If LIDARs and/or cameras did not catch the objects that RADAR, ultrasonic sensors, and thermal imaging cameras or infrared sensors did, then a potential hazardous condition is alerted to the CCU, which can take various action, depend on the distance of the objects, be it slow down, emergency stop, or evasive maneuvering. On the other hand, if the detection by cameras and/or LIDARS is consistent with that from RADARs, ultrasonic sensors, thermal imaging cameras or passive infrared sensors, then the results of the queries are benign. The CCU can continue the autonomous driving control based on the input from cameras and/or LIDARs. The sensors and processors could query each other and reiterate their detection in high speed. Such high speed reiteration is made possible, taking the advantage of the disclosed design of portable controller (200 in FIG. 2), which collocate all the sensors and associated processors on common substrates and/or integrated circuit boards. Most of the queries may reach benign results that need not affect CCU. Such iterations of queries are within the sensors/processors, without burdening the computation capacity of the CCU. The CCU can continue its autonomous driving control based on input from cameras and/or LIDARs. When mismatches are found and confirmed, the CCU will receive confirmed warning of potential missing or misidentification of objects based on cameras and LIDARs. Consequently, the CCU could command to slow down or to stop the automobiles, and alert drivers to take over driving with human judgment.

Such combined usage of sensors and processors will increase the reliability of the detection of pedestrians and improve the safety. Further, the combined usage of sensors and processors, or named as CSC herein, will collectively output simplified categories of data to CCU, in this case, precision and reliable detection of objects, thus, reduce the computational demand for the CCU, which would otherwise, need to receive and to integrate the information from individual sensors, which can be prone to error that may lead to fatal accidents. The CCU stays at a higher hierarchy and intervene only when receive results that need it to take action, while the CSCs are crosschecking among each others at sensors/processors level constantly.

The example disclosed herein, is intended to demonstrate such applications, therefore, should not limit such applications to the said example.

The application of compound sensor clustering (CSC) for road sign and image detection and interpretation can be illustrated by the following example:

In the current autonomous driving control, cameras and associated processors are used to detect road signs, and to interpret the meaning of them, such as traffic lights, and/or speed limit signs, and/or stop/yield signs, and/or exit signs, and/or construction slowdown caution signs, and/or temporary detour signs, etc . . . with application of pattern recognition and/or artificial intelligence (AI) that are programmed into the processors associated with or integrated with the cameras. The LIDARs can be used to quantify the location and distance of the road signs in three dimensional spaces. However, there can be errors in the real-world application. The signs could be obscured by dust; and/or by leafs; and/or by snow; and/or by ice etc . . . for which cameras could miss or misidentify them.

In the above application, RADARs and ultrasonic sensors can be used to detect road signs based on the echo from the shape and material of the road signs. The detection by RADARs and/or ultrasonic sensors can be used to query the cameras as an assurance of not to miss or misidentify any objects that could be road signs. The information on the road signs can still be interpreted by cameras and associated processor that has built-in pattern recognition capabilities. If the RADARs and/or ultrasonic sensors detect objects that may be road signs, while cameras do not, the CSC could forward a warning to CCU, which could alert the drivers to take over driving based on human judgments if there are road signs and what they mean.

Such combined usage of sensors and processors can increase the reliability of the detection of road signs. In this case, the RADARs and ultrasonic sensors can query the cameras to form a CSC when they detect objects that are potential road signs. In most cases the detection should be consistent and the queries should reach benign results, which do not require the CCU to take special action. The CSCs are additional assurance to make sure the detection of road signs under abnormal conditions, in which the road signs may be obscured.

The example disclosed herein, is intended to demonstrate such applications, therefore, should not limit such applications to the said example.

The application of compound sensor clustering (CSC) for environment condition detection and adaptation can be illustrated by the following examples:

1) Temperature sensors and water sensors can be used jointly to determine if there is a freezing rain condition, if the temperature sensors detect a temperature in the vicinity of freezing while the water sensors detect certain level of rain. The query can be started by the temperature sensor/processors. The query can include cameras, which can capture images of rain and/or snow, with the assistance of pattern recognition that is programmed in the associated processors. If an ice rain condition is confirmed by the query, then the CSC provides the categorized environment condition information data, in this case, a freezing rain condition, to the CCU, which can control the speed of the automobiles according to the weather condition. If there is no rain while the temperature is near freezing, then result from this query is benign, and that the CCU can continue its normal autonomous driving control based on input from cameras and/or LIDARs.

2) One of the physical-chemical sensors, such as a smoke detector, may detect a potential burning condition by sampling air content. The information can be used to query the thermal imaging cameras or passive infrared sensors to determine if there is a fire condition in the vicinity, such as burning of bush, tree, or even vehicles. If there is not, then there is a potential that the automobile being driven may have a fire hazardous. Based on the cross-checking results of the CSC, the CCU can control the automobile to change lanes to keep distance from the fire condition, or to stop the automobile if the CSC determined that there is a potential fire hazardous on the automobile. In such case, when smoke detector detects a burning condition, the results will not be benign. Either there is a burning condition in the vicinity such that the automobile should be controlled to stay away from the fire condition, or to stop the automobile which may have a potential fire hazardous on itself.

3) Sound sensors (microphones) could detect sirens from fire engines and/or police cars, and/or voice instruction from police, via voice recognition that is programmed in the processors associated or integrated with the sound sensors. Such information could be used to query the cameras, which could recognize the fire engines and/or police cars, via pattern recognition that is programmed in the processors for cameras. As the result, the CSC can provide the categorized environment condition information data, in this case, law enforcement authorities, to the CCU, which can alert the drivers to take over the driving, and/or to control the automobiles to yield or to stop accordingly.

The examples disclosed herein, are intended to demonstrate such applications, therefore, should not limit such applications to the said examples.

The application of compound sensor clustering (CSC) for interaction with the automobiles can be illustrated by the following examples:

1) When automobiles are driven on curved roads, such as highway ramps, the speed and steering angle need to be balanced to prevent rollover accidents. Gyroscopes can detect the inclination angles needed to balance against the combined gravity and centrifugal forces. Motion sensors (accelerometers) can be used to sense any excessive lateral acceleration that may cause rollover accidents. Further, when such inclination angles and lateral acceleration are detected, the CSC could query the cameras and/or LIDARs for the upcoming road curvatures. As the result, the CSC can provide the categorized information of interaction with automobiles, in this case, lateral stability, to the CCU, which then determines appropriate speed in relation to steering angle for the automobiles to drive towards the upcoming curved roads while maintaining lateral stability to avoid rollover accidents.

2) Motion sensors (accelerometers) may detect excessive vibration input that may come from rough road surfaces. Such information may be used to query the cameras with built-in capability of pattern recognition to recognize road surfaces, to determine if there is rough road surfaces ahead, and/or if there is alternative smoother road surfaces in the adjacent lanes. As the result, the CSC can provide the categorized information of interaction with the automobiles, in this case, rough road surfaces, to the CCU, which then determines appropriate speed to avoid excessive vibration, or to change lanes to smoother road surfaces if any.

3) In case of ABS activation feedback when the CCU (230 in FIG. 2) applies braking, such feedback can be used as a sensor information to query the water sensors and temperature sensors to determine if freezing rain and/or icy road conditions. It could further query cameras with pattern recognition capabilities, to differentiate if icy road surfaces or lose gravel patches. As the result, the CSC can provide the categorized information of interaction with automobiles, in this case, low coefficient of friction road surfaces, to the CCU, which then determine appropriate driving policy, be it continue to brake if icy road surfaces, or to maneuver to avoid gravel patches etc.

4) In case of determining drivers' attention while on autonomous driving mode, the information detected by cameras and other sensors may be used to query the drivers for their attention to the driving condition. The CCU (230 in FIG. 2) can send voice questions periodically, through the user interface (260 in FIG. 2), and check if the voice response from the drivers are correct or not, by using voice recognition technology and artificial intelligence. Such query questions could be composed based on the images from the cameras, and/or information from other sensors. Such questions could be, but not limited to: "What is the color of the vehicle in front of you?" and/or, "What is the current road speed limit?", and/or "Is it raining?" and/or, "Are there pedestrians in front of you?" . . . If the responses from the drivers are incorrect, or the drivers failed to respond, then it may be determined that the drivers are not attending the driving condition. Consequently, the CCU could alert the drivers with warning sound, images, and/or vibration, etc. through the user interface (260 in FIG. 2); and/or stop the automobiles. In such cases, the sensors/processors are querying the human drivers to form a unique form of CSC. Such usage of sensors and processors for the interaction with the drivers can enhance the safety.

The examples disclosed herein, are intended to demonstrate such applications, therefore, should not limit such applications to the said examples.

As seen in the above examples, each of the sensors/processors can have a set of criteria to query other sensors/processors for information relevant to particular driving conditions. The queried sensors/processors, include the initial sensor/processor, are forming a cluster to verify and confirm the particular driving conditions. A query can involve as little as only two sensors/processors. It can also involve more than two sensors/processors, depend on the nature of the driving conditions. A query can involve multiple sensors/processors in a parallel process. A query can also involve multiple sensors/processors in a sequential process. Additionally, a sensor/processor can initiate multiple queries for multiple driving conditions. Further, sensors/processors are working independently, they could initiate multiple queries simultaneously for detection and confirmation of various of driving conditions.

Each sensor/processor can have a set of criteria to query other sensors/processors to identify certain driving conditions. A query is trigged when a sensor/processor detects information that meet a threshold criterion for certain driving condition, such as in the case when temperature sensor/processor detects a near freezing temperature, or in the case when thermal imaging cameras or passive infrared sensors detect human heat signatures. The reason to query other sensors/processors is that almost all of the real-world driving conditions can only be determined when multiple sensors/processors are used. As seen in the examples before, icy rain condition can be determined by water and temperature sensors; and pedestrians can be confirmed by thermal imaging cameras or passive infrared sensors in additional to object sensors like RADARs or ultrasonic sensors; and lateral stabilities are determined by inclination angle, lateral acceleration, steering angle, and speed etc . . .

The criteria of sensor/processor "A" can be expressed as $A_1, A_2, A_3 \ldots$; while sensors "B", "C", and "D" can have their criteria of $B_1, B_2, B_3 \ldots, C_1, C_2, C_3 \ldots,$ and $D_1, D_2, D_3 \ldots,$ so on and so forth. Each sensor/processor will be programmed to have at least one criterion, although it could have more. For example, a temperature sensor/processor could have multiple criteria, alerting extremely cold, near freezing, and high temperature conditions. Each criterion will be associated with at least one query to address specific driving condition. Each query could cross check with another single sensor/processor or multiple of sensors/processors for a specific driving condition. The query could also be sequential, such that when B is queried by A, it can joint with sensor A to query sensor C, depend on the nature of the driving condition involved. Each sensor/processor can have multiple criteria to initiate multiple queries for varieties of driving conditions. The query process essentially self-organize sensors/processors to clusters to address specific driving conditions dynamically. The method is named herein as Compound Sensors Clustering, or CSC (201 . . . ; 211 . . . in FIG. 2). The key of the CSC process is to define all the queries and their triggering criteria appropriately.

When more sensors/processors are employed, as intended in the disclosed portable universal autonomous driving system herein, the possible combinations of the CSCs can mutate to very large multiple dimensional matrixes, which can eventually cover all the real-world driving situations. Each element of a possible CSC may be expressed as $CSC_{(a,b,c,d, \ldots )n}$, where "a,b,c,d . . . " denotes the sensors/processors involved in the CSC, and "n" is the total number of sensors/processors in the system. The possible combinations of the queries can form "n" dimensional matrices, in which each dimension can have the number of elements equal to the number of queries defined. The matrices will not be fully populated, i.e., not all the sensors/processors will be queried at all the time. However, even a sparsely populated "n" dimensional matrices can have a large number of components $CSC_{(a,b,c,d, \ldots )n}$, which could address all the real-world driving conditions.

As an example, ten sensors could form ten-dimensional matrices of CSCs. If each sensor has criteria to query only a few other sensors, it could mutate to thousands of elements of $CSC_{(a,b,c,d, \ldots )n}$. The portable universal autonomous driving system disclosed herein in may very well involve approximately twenty sensors/processors, which can mutate to hundreds of thousands of elements of $CSC_{(a,b,c,d, \ldots )n}$ that can cover all the real-world driving conditions that human drivers could possibly encounter in the real-world driving, provided that the content of queries and their associated triggering criteria are pre-programmed appropriately.

Each of the sensors/processors is working independently. The queries are only trigged when a sensor/processor has detected information that meet the threshold of its criterion. The sensors/processors are self-organizing based on their query criteria to form CSCs dynamically. When the criteria are set to reflect the real-world driving condition judgments, the sensors/processors will be self-organizing to varieties of CSCs that can cover all the real-world driving conditions. It may be noted that there could be multiple queries at any given time, since that the sensors/processors are working independently. This is the reason that the CSC approach can mutate to very large matrices of elements, or $CSC_{(a,b,c,d, \ldots )n}$, which can cover all the real-world driving conditions. The results of the queries of the CSC will be forwarded to the CCU, which makes driving policies accordingly and controls the automobiles. Most of the $CSC_{(a,b,c,d, \ldots )n}$ will reach benign results that need not affect the CCU. But even if only a small portions of the $CSC_{(a,b,c,d, \ldots )n}$ reach results that affect autonomous driving controls, it will significantly improve safety and other driving aspects.

The processors herein are associated with specific sensors. All the sensors have their own dedicated processors. They can be digital graphics processors, image processors with pattern recognition capabilities, voice processors with voice recognition capabilities, application specific instruction set processors, or just applications embedded in other processors. The level of sophistication of the processors needed depends on their processing tasks. Additional processors may be added to manage information from automobiles, such as ABS activation, traction control (TCS), airbag deployment, speed . . . etc. The sensors/processors may share common substrates or integrated circuit boards, taking advantage of the portable controller disclosed herein which integrates all hardware and software together. The processors will be integrated and be made compact.

The queries are programmed in the processors. The queries address specific driving conditions, such as pedestrian protection, icy road conditions, rollover prevention . . . etc. There are many more driving conditions can be comprehended with certain criteria, which will be continuously developed. The CSC methodology disclosed herein provides a framework for such development process. Each query will lead to a particularly CSC element, denoted as $CSC_{(a,b,c,d, \ldots )n}$, which will output a specific driving condition. Many of the CSCs may reach benign results that need not affect driving policies determined based on LIDARs and/or cameras. But there will be cases that the CSC will find risks or mistakes that the main autonomous driving sensors, such as LIDARs and/or cameras, may overlook or misidentify. This is simply because other sensors are based on different physics, which can be much more accurate and reliable than LIDARs and/or cameras in particular situations. Besides, other sensors can detect information that LIDARs and/or cameras could not, such as temperature, infrared, acceleration, inclination angles, air content . . . etc which should all be part of autonomous driving controls.

The basic sensing instruments could still be the LIDARs and/or cameras, which can provide precise location and dimension of objects along with recognizing variety of roads and lanes. It can be used to determine driving control policies by the CCU. LIDARs and/or cameras can initiate queries to other sensors/processors as well. For instance, when curved roads are detected, they may query gyroscopes and motion sensors (accelerometers) for status of lateral inclination angle and lateral acceleration in order for the CCU to control the lateral stabilities of automobiles driving towards the upcoming curved roads. In another word, the main sensing instruments, LIDARs and/or cameras, can initiate CSCs, instead of relying on own sensing capabilities alone.

The CSC approach may be analogous to human driving behavior, which combines vision, hearing, temperature sensing, smelling, touching (vibration or acceleration) . . . . As an analogy, when human hear sound through their ears, their eyes will look into the source of the sound subconsciously, without engaging brain conscious thinking. In this case, the ears and eyes are sensing together like a CSC disclosed here in. The combined information obtained by eyes and ears will then become integrated information that engages the brain thinking and reaction. So the brain is working like the CCU in a higher hierarchy. It should be noted that not all the sensors/processors are monitored or controlled by the CCU at all the time. The approach of CSC reliefs the computational demand to the CCU, which is at a higher hierarchy. Furthermore, the sensors will exceed the human physical sensing capabilities, such as infrared, RADAR and ultrasonic echoes, oxygen content, altitude, or even air quality (PM2.5) . . . etc. Jointly, the combination applications of the sensors can make the autonomous driving system disclosed herein safer. The disclosed invention herein adapts human driving behavior, which employs human sense for sound, vibration, gravity, inclination angle etc., in addition to their eyes, for which the LIDARs and cameras could only partially mimic the visual functions of human. It further goes beyond the capabilities of human sensibility, thus, can make the autonomous driving system disclosed herein better than human driving. The additional sensors are typically mature technologies and are low in cost, comparing with LIDARs and cameras. However, they could make the autonomous driving system disclosed herein much more robust and safer in varieties of driving conditions. It may be noted that LIDARs and cameras are only mimicking human vision in a primitive way. They can be accurate in certain aspect, such as distance and dimension measurement. But they can miss or misidentify objects. The supplement of other sensors would not only improve the vision reliability, but would also include all other human sensing capabilities and beyond, far better than depending on cameras and/or LIDARs only. Such compound sensor clustering approach (CSC) will make the autonomous driving system disclosed herein much more robust and reliable.

The embodiment of the design of the data links (241 . . . in FIG. 2) disclosed herein is wireless telecommunication for any other data that could not be obtained on-board. Such data shall include real-time traffic and map information; and information from other automobiles that are in the vicinity of the automobiles being controlled; and information from infrastructures.

The embodiment of the design of the global positioning system (GPS 250 in FIG. 2) disclosed herein is to serve the function of identifying the location of the portable controller (200 in FIG. 2). Such function could also be performed by systems other than GPS that serve the same function.

The embodiment of the design of the data storages (221 . . . in FIG. 2) disclosed herein comprise one or more physical data storage devices that serve the CCU (230 in FIG. 2), as well as other subsystems, such as the compound sensor clustering (CSC) (201 . . . , 211 . . . in FIG. 2), and data links (241 . . . in FIG. 2), and the GPS (250 in FIG. 2), for their temporary and/or permanent data storage.

The embodiment of the design of the central control unit (CCU 230 in FIG. 2) disclosed herein integrates all the information necessary for the autonomous driving, which comprise at least one of the: the self-obtained information from the compound sensor clustering CSC (201 . . . ; 211 . . . in FIG. 2) which include input from LIDARs and/or cameras and the broad meaning sensors discussed in the previous paragraphs; and infrastructure obtained information from data links which include at least one of the maps, real time traffics, V2V, V2X (241 . . . in FIG. 2); and position information which can come from GPS (250 in FIG. 2); and drivers instruction through the user interface (260 in FIG. 2). The CCU uses all the inputs and employs its internal algorithms to reach driving policies and commands, and control the automobiles via the communication ports (100 in FIG. 1). Such control algorithms shall cover all real-world driving situations comprising: driving on highways; and/or driving on city roads; and/or driving on country roads; and/or driving on mountain terrains roads; and/or driving in suburban communities; and/or driving in parking lots; and/ or entering and exiting highways; and/or driving through intersections following instructions of traffic lights or road signs; and/or evasive maneuvering, and/or collision avoidance; and/or pedestrians avoidance and protection; and/or lane centering and lane changing; and/or adaptive cruise control; and/or alerting automobiles in vicinities when turning, or stopping; and/or yielding to authority and public service automobiles; and/or detection and adaptation to severe weather condition; and/or adapting status information of the automobiles being controlled . . . etc. Many of the real-world driving situations are being assisted by the CSCs discussed in the previous paragraphs. Cameras and/or LIDARs alone could not accomplish all the above driving tasks.

The embodiment of the design of the CCU (230 in FIG. 2) disclosed herein is at a higher hierarchy and receives input from the CSCs (201 . . . , 211 . . . in FIG. 2). When a particular CSC is initiated, or $CSC_{(a,b,c,d,\ldots)n}$, the CCU (230 in FIG. 2) may be notified, which will take specific action to address the driving conditions detected and confirmed by this specific $CSC_{(a,b,c,d,\ldots)n}$, unless the result of which is benign. Such clustering is initiated at sensors/processors level, which query and verify with each other for relevant categories of driving information. The CCU receives categorized data input that has been verified at the CSC level. The CCU is at a higher hierarchy of making driving policies. If there is conflict of finding within the sensors/processors of a particular $CSC_{(a,b,c,d,\ldots)n}$, the CCU should have algorithms to make driving policy decisions based on safety as the priority. For example, if thermal imaging cameras or passive infrared sensors confirm finding of potential pedestrian with ultrasonic sensors and/or RADARs, while LIDARs and/or cameras do not, the CCU should ignore the LIDARs and/or cameras and issue driving commands to avoid potential collision with pedestrians, be it an emergency stop or an evasive maneuvering.

The embodiment of the design of the CCU disclosed herein integrates feedback parameters (121 . . . in FIG. 1), such as, but not limited to: ABS activation, TCS (traction control), airbag deployment, speed . . . etc. The feedback is treated as general meaning of sensors, which could initiate queries and form CSCs with other sensors/processors. Additional processors for the feedback parameters may be added. They can also be direct input to the CCU for its driving policy making, such as slowing down when TCS is activated.

The embodiment of the design of the CCU disclosed herein integrates status parameters of the automobiles, such as, but not limited to: fuel level, battery charge, tire pressure, engine oil level, coolant temperature, windshield washer level etc (131 . . . in FIG. 1), and incorporate them into driving policies, such as, but not limited to: optimizing refueling routes based on fuel level of the automobiles and the destinations instructed by the drivers; and/or recommending recharging for electrical automobiles and PHEVs if the CCU determines insufficient charge for the destinations instructed by the drivers; and/or alerting drivers or stop automobiles when CCU receiving abnormal parameters such as engine coolant low, or temperature high, or tire pressure low etc.

The embodiment of the user interfaces (260 in FIG. 2) disclosed herein serves the functions of interacting between the drivers and the portable controllers (200 in FIG. 2). The user interfaces shall be connected with the portable controllers at all the time, by means of Wifi or Bluetooth, or any other wireless connection methods. The connection could also be wired, if the mounting fixtures (160 in FIG. 1) have wired connection option, so that the user interfaces can be connected with the portable controllers (200 in FIG. 2) via CAN Bus in the automobiles. Dual approaches, that are, both wireless and wired connections, could be considered for safety redundancies. Such connection methods and options shall be standardized across automotive industries via SAE and/or its international equivalents. The communication between the drivers and the user interfaces (260 in FIG. 2) comprises the following forms: visual display and touch screen input; sound broadcast and voice input (speakers and microphones); vibrations etc . . . As stated in the requirement of the mounting fixtures (160 in FIG. 1), the location of the user interfaces (260 in FIG. 2) shall be in the interior of the automobiles, and within the reach of the drivers in the automobiles, and within the sight of the drivers in the automobiles, and within the hearing range of the drivers in the automobiles, and within the range of the microphone on the user interface to pick up the voice of the drivers, so that the drivers can operate the portable controllers (200 in FIG. 2) via the user interface.

An alternative design for the user interface (260 in FIG. 2) would be integrating the interfacing functions into the instrument panel or the center console displays of automobiles that adapt the communication ports (100 in FIG. 1). Such integration should meet all the standard requirement of the user interface (260 in FIG. 2), so that it could communicate with the universal autonomous driving portable controllers (200 in FIG. 2) reliably. In such an alternative, the user interface (260 in FIG. 2) becomes part of the communication port (100 in FIG. 2).

Although it is possible to use cell phone applications to accomplish the user interface functions, it is preferred to have the user interface hardware be firmly mounted in the interiors of automobiles, or be built-in on to the center consoles or instrument panels of automobiles, to assure that the drivers could access the user interfaces at all the time. Cell phone may be dropped off or be misplaced, which is not preferable as a safety precaution.

The embodiment of the design of the portable controller (200 in FIG. 2) disclosed herein is intended for fully autonomous driving of automobiles. However, the implementation can be divided to various stages, depending on the maturity of control algorithms, and/or the availabilities of various sensors and processors, and/or the cost controls, and/or the infrastructures (V2V, V2X) development, and/or the acceptance of consumers and the market, and/or the implementation and enforcement of traffic laws and regulations relevant to autonomous driving, etc. The function of the portable controller (200 in FIG. 2) can be gradually implemented and increased, for various level of autonomous driving defined by NHTSA.

The embodiment of the design of the portable controller (200 in FIG. 2) disclosed herein interacts with the buffer memory controller (BMC 140 in FIG. 1) in the communication port (100 in FIG. 1). The Central Control Unit (CCU 230 in FIG. 2) in the portable controller constantly streams control data to the BMC (140 in FIG. 1) with emergency driving instruction to make emergency stops according to the instantaneous driving condition in the vicinity of the automobiles. In the case of loss of connection with the portable controllers due to accidents or other failure conditions, the BMC will act as an instantaneous driving control unit for a short duration that is sufficient to make safe stops of the automobiles, if the drivers could not take over the driving or become incapacitated. This function is a fail-safe design of additional safety of the autonomous driving system disclosed herein.

The partitioning of the portable controllers (200 in FIG. 2) can take various forms. Although a single unit of portable controller may be simple to develop, there may be other constraints. Such constraints may come from the requirement of sensors which would better function when they are spread out instead of being concentrated. Other constraints may come from styling of automobiles which prefer hiding away the portable controllers. Following examples demonstrate some of the potential partitioning:

Example 1:
A single unit of a portable controller is designed to be placed on roof top of an automobile. Correspondingly, the communication ports (100 in FIG. 1) should be standardized for the approximate location (171 . . . in FIG. 1), the connection methods (151 . . . in FIG. 1), and the fittings (181 . . . in FIG. 1), such that the single unit potable controllers can be interchangeable from automobiles to automobiles.

Example 2:
A pair of twin portable controllers are placed at the locations of two OSRV (outside rear view mirrors). In such design, the twin portable controllers are plugged-in at the places of OSRVs. The design could hide away the presence of the portable controllers which appear to be OSRVs. Further the left and right twin portable controllers are spread out at the widest span of automobiles, which may allow some of the sensors, such as the cameras, to better detect distance perceptions. The locations of OSRVs are also convenient for users to plug-in or to remove the twin portable controllers. The connection methods and the anchorages have been specified in the description of communication ports earlier. A design of digital OSRVs is derived from such application, which is also specified in the description of communication ports. The twin portable controllers are connected to each other via the CAN in the communication ports for their internal communication. Such design can be standardized through SAE or its international equivalents.

Example 3:
A set of quadruple portable controllers are inserted to the front and rear fascias. The four communication ports are to be placed approximately at four outer corners of automobiles. Four inserts are made as the communication ports (100 in FIG. 1), as detailed in the description of communication ports. The internal communication between the four portable controllers would be through the CAN Bus in the communication ports. Such design can be standardized through SAE or its international equivalents. There are pros and cons to the design. It is advantages for the sensors to be at the outer corners of automobiles for broader detection coverage. The design also hides away the four portable controllers well. However, the positions of fascias are low, prone to dust accumulation, which may impair the sensor's ability to sense. Additionally, they are in the crash zone for which the repair cost would be high in case of collisions. An alternative of this design is to integrate the quadruple portable controllers with the front and rear lamps as part of assemblies (POAs). The POAs serve the dual function of portable controllers and the lamps. They can share the same connectors and wire harness so that the lamps and POAs could interchange. Such alternative design would hide away the portable controllers well. However, it makes the external geometries of the portable controllers unique to models of automobiles, since that the styling of front and rear lamps are usually unique from automobiles to automobiles. This may make the quadruple portables design be factory-installed options or after market service items.

The embodiment of the design of the portable controllers (200 in FIG. 2) disclosed herein are standalone devices that can be manufactured as consumer electronics in mass production, since that they are integrated and can be made compact. Such advantages do not exist when the individual components (sensors, processors, central control unit, data storage, data links, GPS . . . ) are packaged into various parts of automobiles.

I claim:

1. An autonomous driving system for an automobile, comprising:
   a) one or more common electronic communication ports (100) for autonomous driving, wherein the communication ports are built-in on the automobile;
   b) one or more universal autonomous driving portable controllers, wherein said portable controllers are plugged in to the exterior of the automobile via the communication ports to detect a driving environment and to control the automobile for autonomous driving; wherein the communication ports and portable controllers share common interfaces;
   c) said one or more communication ports having a primary high speed control area network wherein said primary high speed control area network providing communication between said one or more portable controllers via said one or more communication ports, and at least one electronic control unit, further wherein said at least one electronic control unit configured to control at least one of steering, braking, and acceleration;
   d) said one or more communication ports having a secondary control area network, said secondary control area network configured to provide electronic communication, via said one or more communication ports, between said one or more portable controllers and secondary electronic control units, said secondary electronic control units configured to control at least one of turn signals, brake lights, emergency lights, head lamps and tail lamps, fog lamps, windshield wipers, defrosters, defogs, window regulators, and door locks;
   e) said one or more communication ports having a tertiary control area network configured to electronically communicate at least one feedback parameter to said one or more portable controllers, via said one or more communication ports, said at least one feedback parameter comprised one or more of velocity, acceleration, ABS activation, airbag deployment, and traction control activation;
   f) said one or more communication ports having a quaternary control area network configured to electronically communicate at least one status parameter to said one or more portable controllers via said one or more communication ports, said at least one status parameter comprised of one or more of fuel level, battery charge, tire pressure, engine oil level, coolant temperature, and windshield washer level;
   g) said one or more communication ports having a buffer memory controller that provides emergency control instruction for emergency stops of the automobiles in the event of loss of electronic connection with the portable controller due to accidents or other failure conditions;
   h) said one or more communication ports having electronic connections to the portable controllers and adapted to take at least one of the methods of: wired pin connections, wireless connections, or combinations of wired pin and wireless connections;
   i) said one or more portable controllers adapted for mounting locations and anchorages for the portable controllers, which match with the configurations of the portable controllers;
   j) a driver interface, said driver interface positioned to enable the driver to provide driving instructions to said one or more portable controllers;
   k) said one or more portable controllers having a plurality of sensors, said plurality of sensors comprising:
      i. one or more digital color cameras that detect optical information;
      ii. one or more LIDARs that detect geometrical information;
      iii. task specific sensors, including one or more ultrasonic sensors to detect near distance objects;
      iv. one or more RADARs to detect median and far distance objects;
      v. one or more thermal imaging cameras or passive infrared sensors to detect objects that have heat emissions;
      vi. one or more three dimensional accelerometers to detect acceleration and vibration in vertical, lateral, and fore/aft directions;
      vii. one or more gyroscopes to detect inclination angles;
      viii. one or more physical-chemical sensors which adapted to detect specific air contents;
      ix. one or more sound sensors to detect human languages or warning sirens;
      x. one or more water sensors for detecting rain and rain intensity;
      xi. one or more temperature sensors adapted for detecting temperature at the vicinity of the automobiles;
   l) said one or more portable controllers having a plurality of processors comprising:
      i. one or more processors for the digital color cameras;
      ii. one or more processors for the LIDARs;
      iii. one or more processors for the ultrasonic sensors;
      iv. one or more processors for the RADARs;
      v. one or more processors for the thermal imaging cameras or passive infrared sensors;
      vi. one or more processors for the one or more three dimensional accelerometers;
      vii. and one or more processors for the gyroscopes;
      viii. one or more processors for the physical-chemical sensors;
      ix. one or more processors for the sound sensors;
      x. one or more processors for the water sensors;
      xi. one or more processors for the temperature sensors;
   m) said one or more portable controllers programmed to generate driving instructions based on information from said plurality of processors; said processors of the plurality of processors programmed to generate queries addressing specific driving conditions, said specific driving conditions being determined by pre-defined criteria, wherein said queries include queries between the processors of said plurality of processors, said queries programmed in the processors;
   n) said one or more portable controllers having a Central Control Unit to direct the operations of the processors;
   o) said one or more portable controllers having a plurality of communication links to send and/or receive data, said communication links including vehicle-to-vehicle and vehicle-to-infrastructure links;
   p) said one or more portable controllers having a global positioning system to identify the locations of the automobiles to which the portable controllers are plugged-in;
   q) said one or more universal autonomous driving portable controllers are compatible with said communication ports.

2. The autonomous driving system of claim 1 wherein,
   a. the processors of said plurality of processors are integrated into said one or more portable controllers,
   b. the sensors of said plurality of sensors are each integrated with at least one of the processors.

3. The autonomous driving system of claim 2 wherein the sensors of said plurality of sensors are built on one or more common substrates and/or integrated circuit boards.

4. The autonomous driving system of claim 2 further comprising wherein querying sensors are dynamically organized as clusters to function as groups such that sensors and processors communicate with each other to validate sensed information pertaining to specific driving conditions.

5. The autonomous driving system of claim 2 further comprising wherein queries function to detect mismatches between information between sensors and alert the Central Control Unit when mismatches are found.

6. The autonomous driving system of claim 5 wherein a mismatch between LIDARs and RADARs generates an alert to the central Control Unit, thereby enabling the Central Control Unit to respond to potential hazards.

7. The autonomous driving system of claim 5 wherein information derived from queries from the temperature sensors and water sensors is used to jointly determine a potential freezing rain condition.

8. The autonomous driving system of claim 5 wherein the queries for detection of said potential freezing rain condition include detection of rain, and/or ice, and/or snow using captured images and pattern recognition.

9. The autonomous driving system of claim 5 wherein detection of smoke by said physical chemical is used to query the thermal imaging cameras of passive infrared sensors to determine if there is a hazardous fire condition.

10. The autonomous driving system of claim 5 wherein road curvatures are detected by the cameras and/or LIDARs when lateral acceleration is detected by combined information from said gyroscopes and accelerometers to inform the central control unit of lateral stability status.

11. The autonomous driving system of claim 8 wherein ABS activation feedback triggers querying the water and temperature sensors.

12. The autonomous driving system of claim 2 wherein the cameras are queried to identify icy road surfaces, thereby generating a categorized information of low coefficient of friction road surface to the Central Control Unit.

13. The autonomous driving system of claim 5 wherein information derived from queries from the cameras and thermal sensors is used to jointly verify an existence of pedestrians.

14. The autonomous driving system of claim 5 wherein,
   a. said thermal sensors are queried to detect a human heat signature, and if the human heat signature is detected, then,
   b. the thermal sensor's processor queries object detection sensors for the presence of a human, said object sensors comprising the cameras, LIDARs, RADAR and/or the ultrasonic sensors.

15. The autonomous driving system of claim 5 wherein information derived from the RADARs and/or the ultrasonic sensors detection of a potential road sign generates a query to the cameras, thereby reducing likelihood of missing or misidentifying road signs.

16. The autonomous driving system of claim 15 wherein the queries from a RADAR are generated for detection of a road sign not identified or misidentified by camera captured images and pattern recognition.

17. The autonomous driving system of claim 3 further comprising wherein querying sensors are dynamically organized as clusters to function as groups such that sensors and processors communicate with each other to validate sensed information pertaining to specific driving conditions.

18. The autonomous driving system of claim 17, further comprising wherein queries function to detect mismatches between information between sensors and alert the Central Control Unit when mismatches are found.

19. The autonomous driving system of claim 14, wherein the sensors of said plurality of sensors are built on one or more common substrates and/or integrated circuit boards.

20. The autonomous driving system of claim 3, wherein one or more of the queries from at least one of said one or more RADARs are generated for detection of road signs not identified or misidentified by camera captured images and pattern recognition.

* * * * *